United States Patent
Phelan et al.

(10) Patent No.: US 6,663,527 B2
(45) Date of Patent: Dec. 16, 2003

(54) PLANETARY GEAR SYSTEM FOR CONTROLLING TORQUE TRANSFER IN A VEHICLE DRIVELINE

(75) Inventors: Perry Edward Phelan, Harsens Island, MI (US); Joseph Palazzolo, Livonia, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/034,575

(22) Filed: Dec. 27, 2001

(65) Prior Publication Data

US 2003/0125157 A1 Jul. 3, 2003

(51) Int. Cl.$^7$ .............................................. F16H 47/08
(52) U.S. Cl. ........................ 475/107; 475/108; 475/204
(58) Field of Search ................................. 475/107, 108, 475/104, 199, 204, 206; 180/149

(56) References Cited

U.S. PATENT DOCUMENTS

| | | | |
|---|---|---|---|
| 2,889,717 A | * 6/1959 | Kelley ........................ | 475/199 |
| 2,960,890 A | * 11/1960 | Davis ..................... | 475/107 X |
| 3,447,400 A | 6/1969 | Serniuk | |
| 3,899,941 A | 8/1975 | Cook | |
| 3,924,490 A | 12/1975 | Mills | |
| 4,672,861 A | * 6/1987 | Lanzer ................... | 475/199 X |
| 4,700,800 A | * 10/1987 | Friedrich et al. ....... | 475/107 X |
| 4,729,261 A | 3/1988 | Tervola | |
| 4,989,686 A | 2/1991 | Miller et al. | |
| 5,017,183 A | * 5/1991 | Teraoka ................. | 475/206 X |
| 5,226,860 A | * 7/1993 | Baxter et al. .............. | 475/206 |
| 5,301,769 A | 4/1994 | Weiss | |
| 5,411,110 A | 5/1995 | Wilson et al. | |
| 5,443,426 A | 8/1995 | Frost | |
| 5,485,894 A | 1/1996 | Watson et al. | |
| 5,655,986 A | 8/1997 | Wilson et al. | |
| 5,704,459 A | 1/1998 | Antonov | |
| 5,885,180 A | 3/1999 | Antonov | |
| 5,971,880 A | 10/1999 | Keiser | |
| 6,001,043 A | * 12/1999 | Yun ....................... | 475/204 X |
| 6,135,909 A | 10/2000 | Keiser | |

FOREIGN PATENT DOCUMENTS

| | | | | |
|---|---|---|---|---|
| JP | 361074941 | * | 4/1986 | ................. 475/107 |
| WO | WO 03/006846 A1 | | 1/2003 | |

OTHER PUBLICATIONS

Copy of Search Report for Application No. GB 0226963.7 dated Apr. 29, 2003.

* cited by examiner

Primary Examiner—Ha Ho
(74) Attorney, Agent, or Firm—Brinks Hofer Gilson & Lione

(57) ABSTRACT

A transfer case system distributes torque between primary and secondary drive trains. The system comprises a planetary gear set having a sun gear, a ring gear, a planetary gear intermeshed with the sun gear and ring gear, and a planetary carrier rotatably connected with the planetary gear. The system also comprises a torque sink connected with the sun gear and a torque input shaft connected with the ring gear and the primary drive train. The torque sink applies a braking force to the rotation of the sun gear in response to instructions from a controller, causing the ring gear to output torque to a secondary drive train.

9 Claims, 3 Drawing Sheets

PLANETARY GEAR SYSTEM FOR CONTROLLING TORQUE TRANSFER IN A VEHICLE DRIVELINE

BACKGROUND OF THE INVENTION

The present invention generally relates to transfer cases for providing "on demand" torque to the front or rear wheels of a four wheel drive vehicle. In particular, the present invention relates to a planetary gear set coupled with a torque sink device for transferring torque to the front or rear wheels of a vehicle driveline during slip events.

Computer controlled torque transfer systems for all wheel drive and four wheel drive vehicles are well known in the art. These torque transfer systems provide traction control and enhanced vehicle stability by actively controlling torque distribution from front to rear, side to side, or a combination of both using computer controlled torque biasing devices. Typically, in all wheel drive or four wheel drive vehicles having "on demand" torque transfer systems, torque is distributed between front and rear wheel pairs using a transfer case. In these "on demand" systems, one set of wheels is directly driven by a power source, or engine, via a transmission, drive shaft and axle. The other set of wheels receives torque from the power source through a transfer case using a coupling mechanism such as a center differential or active clutch. These coupling devices regulate power proportion between the front and rear wheels. In the "on demand" torque transfer system, a first set of wheels is primarily driven by the power source and a second set of wheels is driven only when events occur that require torque transfer, such as, wheel slippage, understeer correction or oversteer correction. Where the primary drive wheels are the rear wheels, torque is transferred to the front wheels only when, for example, the rear wheels begin to lose traction. By transferring torque to the front wheels, the front wheels can drive the vehicle until the rear wheels regain traction.

Current systems regulate torque using a clutch system that acts directly between a drive and driven shaft. These clutch systems possess a large number of moving parts and require relatively large actuation forces to transfer torque and control wheel slippage. The clutch based systems also generate large amounts of heat during slip events and require extensive development of the friction material and lubricant in order to avoid "stick-slip" phenomena and clutch moan and chatter. In order to achieve large torque values, many friction surfaces are required. The friction surfaces are prone to wear and therefore may experience wear or degraded performance over the life of the product.

BRIEF SUMMARY OF THE INVENTION

The transfer case of the present invention distributes torque through a vehicle driveline using a planetary gear set coupled with a torque sink device. The planetary gear set provides a compact torque distribution system and, due to gear reductions through the planetary gear set, requires a relatively small braking force to distribute torque.

In accordance with one aspect of the present invention, a transfer case system is provided having a planetary gear set. The planetary gear set is made up of a sun gear, a ring gear, at least one planetary gear intermeshed with the sun gear and ring gear, and a planetary carrier rotatably connected with the at least one planetary gear. The transfer case system also comprises a torque sink connected with the sun gear. The transfer case system further comprises a torque input shaft. The torque input shaft is operably connected with the planetary carrier and is also coupled with a primary drive train. When the torque sink applies a braking force to the rotation of the sun gear in response to instructions from a controller, the ring gear outputs torque to a secondary drive train.

In accordance with another aspect of the present invention, a vehicle control system for distributing torque to primary and secondary drive trains is provided having a planetary gear set. The planetary gear set is made up of a sun gear, a ring gear, at least one planetary gear intermeshed with the sun gear and ring gear, and a planetary carrier rotatably connected with the at least one planetary gear. The vehicle control system also comprises a torque sink connected with the sun gear. The vehicle control system further comprises a torque input shaft. The torque input shaft is operably connected with the planetary carrier and is also coupled with a primary drive train. The vehicle control system also comprises a controller and sensors in communication with the controller wherein the sensors monitor vehicle conditions. When the torque sink applies a braking force to the rotation of the sun gear in response to instructions from the controller, the ring gear outputs torque to a secondary drive train.

In accordance with yet another aspect of the invention, a method for distributing torque between a primary drive train and secondary drive train is provided. In the first step a transfer case system is provided comprising a sun gear, a ring gear, at least one planetary gear intermeshed with the sun gear and ring gear, a planetary carrier rotatably connected with the at least one planetary gear, a torque sink connected with the sun gear, and an input shaft operably connected with the planetary carrier. In the next step, sensors and a controller monitor vehicle conditions for predetermined vehicle conditions that require torque transfer from a primary drive train to a secondary drive train. The torque sink is then instructed to apply a braking force to the rotation of the sun gear when the predetermined vehicle conditions are experienced. The ring gear then outputs torque wherein the ring gear applies torque to a secondary drive train. Finally, the braking force on the sun gear is removed when the predetermined vehicle conditions are no longer experienced.

Advantages of the present invention will become more apparent to those skilled in the art from the following description of the preferred embodiments of the invention which have been shown and described by way of illustration. As will be realized, the invention is capable of other and different embodiments, and its details are capable of modification in various respects. Accordingly, the drawings and description are to be regarded as illustrative in nature and not as restrictive.

DETAILED DESCRIPTION OF THE INVENTION

Figure 1:
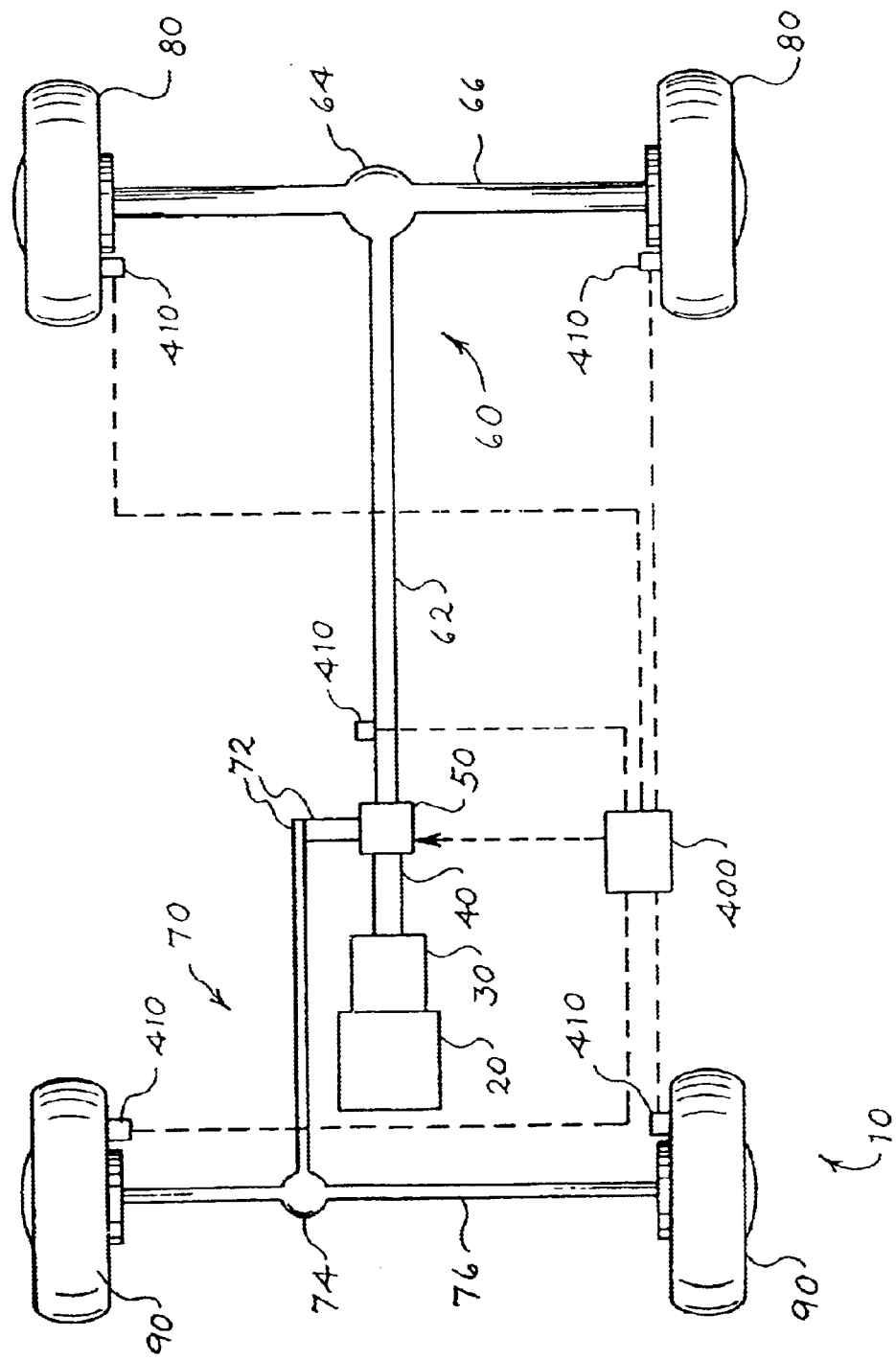
FIG. 1 is a schematic view of a vehicle according to a preferred embodiment of the present invention.

FIG. 1 generally discloses a four wheel drive vehicle 10 having torque "on demand" capabilities. In reference to FIGS. 1 and 2, the preferred embodiment of the present invention generally comprises a power source 20, a transmission 30, an input shaft 40, a transfer case 50, a primary drive train 60, a secondary drive train 70, a pair of rear wheels 80, and a pair of front wheels 90. The power source 20 is preferably an internal combustion engine, however, one skilled in the art will recognize that other sources of power may be used. The transmission 30 is connected with the power source 20 and, through a series of gearing mechanisms, transfers torque to the input shaft 40. The transmission 30 may be either a manual or automatic transmission.

The input shaft 40 transmits the torque output directly to the primary drive train 60 and "on demand" to the secondary drive train 70. As shown in FIG. 1, the primary drive train 60 provides power to the rear wheels 80 of the vehicle and the secondary drive train 70 provides power to the front wheels 90 of the vehicle. For convenience, the preferred embodiment will be described below as a primary rear wheel drive vehicle and a secondary front wheel drive vehicle. One skilled in the art will recognize that this embodiment is only one possible configuration and that the present invention may be configured such that the primary drive train provides power to the front wheels and the secondary drive train provides power to the rear wheels.

Figure 2:
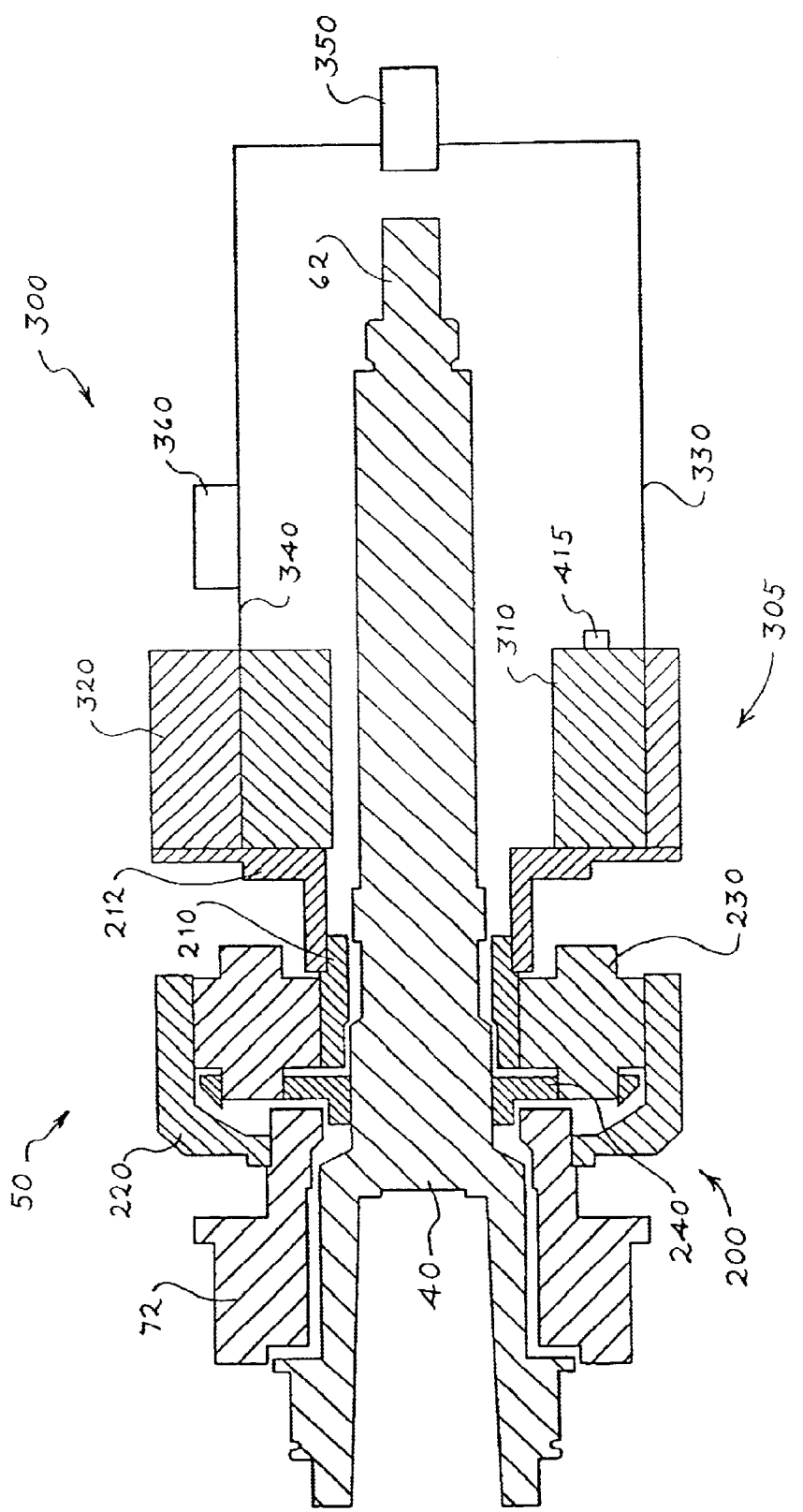
FIG. 2 is a cross-section of the transfer case system according to a preferred embodiment of the present invention.

Preferably, the primary drive train 60 comprises a primary wheel drive shaft 62, a primary wheel differential 64 and a primary wheel axle 66. The secondary drive train 70 comprises a secondary wheel drive shaft 72, a secondary wheel differential 74 and a secondary wheel axle 76. As shown in FIG. 2, the input shaft 40 and the primary wheel drive shaft 62 are preferably a single unit, however, they may also be separate components coupled such that the input shaft 40 powers the primary wheel drive shaft 62.

Figure 3:
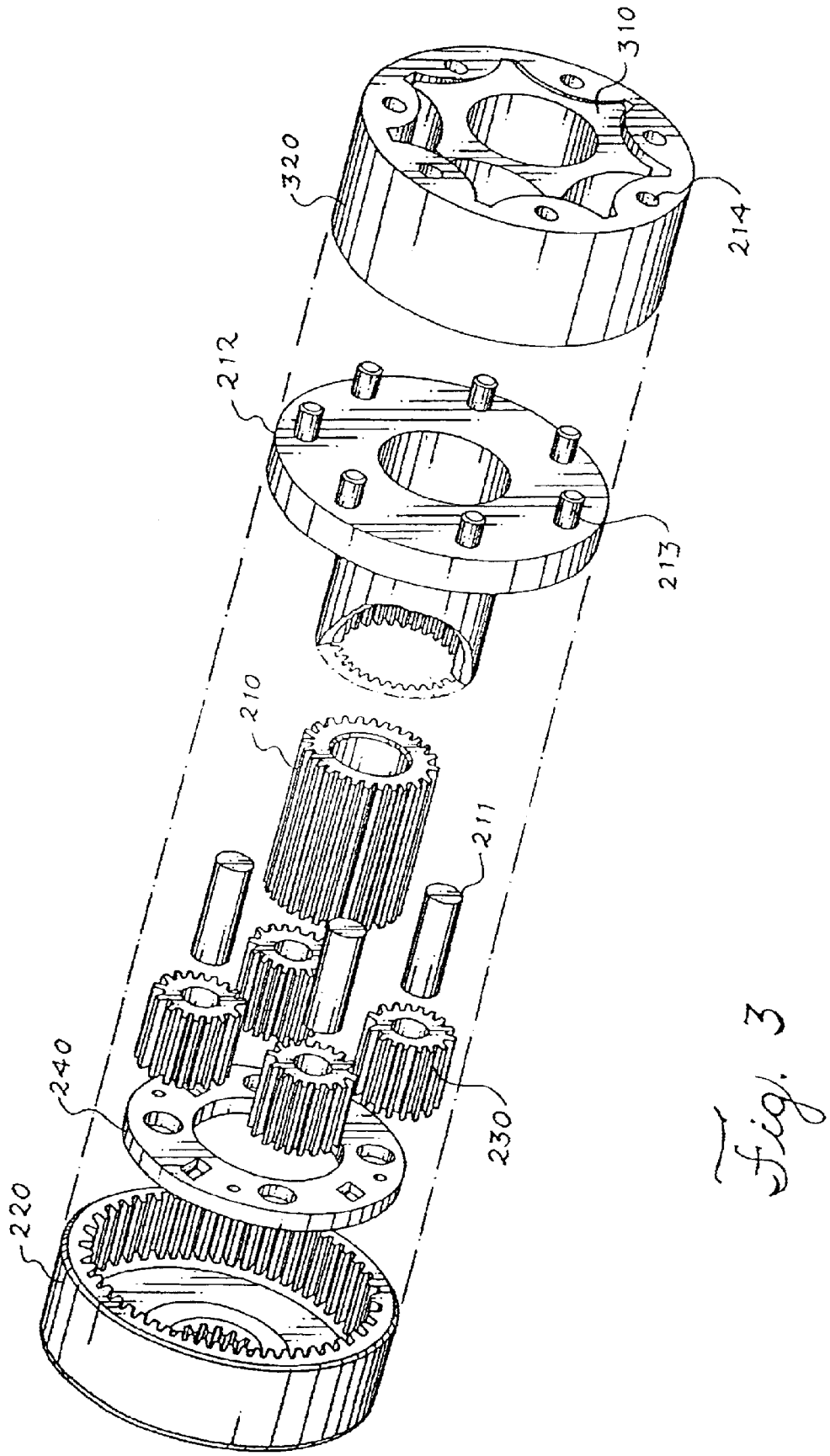
FIG. 3 is a perspective exploded view of the planetary gear set and rotors of the torque sink according to a preferred embodiment of the present invention.

FIG. 2 is a cross section of the internal components of the transfer case 50. The transfer case 50 generally comprises a planetary gear set 200 and torque sink 300. The planetary gear set 200 comprises a set of three relatively rotatable elements; namely, an externally toothed sun gear 210, an internally toothed ring gear 220 and at least one planetary gear 230 which intermeshes with the sun 210 and ring gear 220. A planetary carrier 240 carries said at least one planetary gear 230. Referring to FIG. 3, in the preferred embodiment four planetary gears 230 are used in the planetary gear set 200 and are rotatably connected with the planetary carrier 240 using connecting rods 211. As illustrated in FIG. 2, the sun gear 210 rotates about an axis of rotation and is operably connected with the torque sink 300 via connector member 212. The ring gear 220 is rotatable about an axis of rotation substantially coaxial with the axis of rotation of the sun gear 210 and is operably connected with the secondary wheel drive shaft 72 of the secondary drive train 70. The planetary carrier 240 turns about the axis of the sun gear 210 and is operably connected with the input shaft 40. As shown in FIG. 3, the connector member 212 is preferably internally toothed and intermeshes with the sun gear 210.

The input shaft 40 axially passes through a bore at the center of rotation of the sun gear 210, ring gear 220, and planetary carrier 240. The input shaft 40 is not directly connected with the sun gear 210 or the ring gear 220. The input shaft, however, is coupled with the planetary carrier 240 and causes the planetary carrier 240 to rotate.

The torque sink 300 in the present invention is a torque control device that provides a braking force on the sun gear 210 when predetermined conditions, such as rear wheel slippage, are experienced by the vehicle 10. As shown in FIGS. 2 and 3, and as will be described below for convenience, the torque sink 300 is a gerotor pump 305. One skilled in the art will realize that the torque sink may be any device that controls torque such as a clutch, conventional disc or drum brake, hydraulic pump or electrical retarder.

Referring to FIGS. 2 and 3, the torque sink 300 is a gerotor pump 305 having an inner rotor 310, an outer rotor 320, a fluid inlet line 330, a fluid outlet line 340, a fluid reservoir 350 and a fluid flow control device 360. The fluid flow control device 360 is preferably located in the fluid outlet line 340 and can be a hydraulic or pneumatic cylinder or solenoid, stepper or servo motor controlled piston that may be rapidly actuated. The fluid flow control device 360 operates between a closed actuation state for restricting a predetermined amount of fluid flow through the pump 305 and an open actuation state for allowing substantially free fluid flow through the pump. Relatively high fluid pressure occurs in the pump 305 when the fluid flow control device 360 is in the closed actuation state. In the preferred embodiment, the fluid flow control device 360 restricts substantially all the fluid in the outlet line 340. High fluid pressure produces a braking force on the outer rotor 320 and inner rotor 310 and restricts rotational motion of each rotor. Conversely, relatively low fluid pressure occurs in the pump 305 when the fluid flow control device 360 is in the open actuation state. Low fluid pressure allows the inner and outer rotors to rotate freely without experiencing a substantial braking force. The outer rotor 320 of the pump 305 is fixedly connected with the sun gear 210 by connector member 212 wherein rotational motion of the sun gear 210 causes rotational motion of the outer rotor 320. As illustrated in FIG. 3, connector member 212 is preferably fixedly connected with the outer rotor 320 using connecting pins 213 that mate with connecting bores 214 within the outer rotor 320.

The present invention also comprises a computer control system comprising a computer controller 400 and sensors 410 that monitors vehicle conditions, such as wheel slippage, and initiates torque transfer when the predetermined conditions are experienced by the vehicle. In the preferred embodiment, the sensors 410 monitor the speed at which each wheel is rotating, the steering wheel angle, throttle position, engine speed, anti-lock and stability control system status, and the yaw rate. The computer controller 400 receives and processes data from each of the sensors 410. Vehicle conditions such as differentials in wheel speeds, may indicate that the rear wheels are experiencing low traction and that wheel slippage is occurring. The controller 400 is in communication with the fluid flow control device 360 of the pump 305 and can instruct the fluid flow control device 360 to actuate between open and closed actuation states in response to events that the vehicle 10 is experiencing. The manner in which the planetary gear set 200, pump 300 and computer controller 400 operate and interact with each other will be explained below.

Under normal traction conditions, the power source 20 via the transmission 30 drives the rear wheels 80 of the vehicle 10. In this condition, torque is not being transferred to the front wheels 90 and the front wheels 90 are rotating at the same speed as the rear wheels 80. Within the transfer case 50, the fluid control device 360 of the pump 305 is in an open actuation state to allow fluid to flow though the pump 305 at relatively low pressure which allows the outer rotor 320 to rotate substantially freely. When the fluid flow control device 360 is open, there is no substantial braking force on the rotation of the outer rotor 320 and sun gear 210. The sun gear 210, the ring gear 220 and the at least one planetary gear 230 all rotate at the same speed.

If the controller 400 discovers a speed differential between the front and rear wheels where the rear wheels 80 are moving faster than the front wheels 90, the controller 400 identifies that the rear wheels 80 are experiencing low traction and are slipping. In this condition, it is desirable to transfer torque to the front wheels 90 in order to drive the vehicle with non-slipping wheels. To transfer torque to the front wheels 90, the computer controller 400 instructs the fluid control device 360 of the gerotor pump 305 to rapidly restrict the amount of fluid flow through the pump 305. This rapid flow restriction causes a pressure increase in the pump 305. The pressure increase, in turn, creates a braking force on the rotation of the outer rotor 320, causing the rotational rate of the outer rotor 320 and the sun gear 210 to decrease.

This pressure increase in the pump and the slowing of the outer rotor 320 and sun gear 210 creates torque within the planetary gear set 200. Torque continues to be inputted at the planetary carrier 240 by rotation of the input shaft 40. As described above, the sun gear 210 is fixedly connected to the outer rotor 320 via a connector member 212. The braking force on the outer rotor 320 creates torque on the sun gear 210. The toque of the sun gear 210, in combination with the input of the planetary carrier 240, causes an output torque on the ring gear 220. The torque from the ring gear 220 is then applied to the secondary drive train 70 to drive the front wheels 90.

The planetary carrier 240 must supply the combined torque for both the sun and ring gears, 210 and 220, respectively. The planetary carrier 240 is directly coupled to the input shaft 40 which is directly coupled to the rear wheels 80. Torque that drives the sun gear 210, the outer rotor 320, the ring gear 220, and ultimately the front wheels 90, is transferred from the torque applied to the primary drive train 60. This torque transfer slows the spinning of the rear wheels 80, assisting them in regaining traction. The torque that was driving the vehicle through the rear wheels 80 before slip occurred has now been partially transferred to the front wheels 90. A small portion of the torque is also converted to heat in the fluid pump 305 when the flow of fluid is restricted.

Multiplied torque from the sun gear to the ring gear 220 is proportional to the number of teeth on the ring gear 220 divided by the number of teeth on the sun gear 210. In the preferred embodiment, the sun gear 210 contains 34 teeth and the ring gear 220 contains 74 teeth. In this embodiment, a relatively small torque on the sun gear 210 creates a proportionally larger torque on the ring gear 220. As a result, a relatively small amount of torque on the planetary gear set 200 is required to distribute torque to the ring gear 220 and the secondary drive train 70.

While torque is being transferred between wheel pairs, the computer controller 400 continues to monitor for wheel slippage. If the front wheels 90 begin to slip or if the front wheels 90 and the rear wheels 80 begin to rotate at the same rate, indicating that traction may be available at the rear wheels 80, the computer controller instructs the fluid control device 360 to switch to its open actuation state and rapidly remove the restriction on the flow of fluid. Pressure in the pump decreases, allowing the outer rotor 320 to rotate freely. The torque input from the sun gear 210 into the planetary gear system is removed. All torque is transferred back to the rear wheels 80 and no torque is transmitted to the front wheels 90.

The operation of the present invention also provides a convenient method for determining wheel torque by measuring the fluid pressure of the pump 305. The ring gear 220 torque is proportional to the torque of the sun gear 210 and outer rotor 320. Torque on the outer rotor 320 is also proportional to the pressure and displacement of the pump 305. A fluid pressure sensor 415 may be placed at the gerotor pump 305 for monitoring fluid pressure. Using fluid pressure of the pump 305 as an input, wheel torque can be calculated by the computer controller 400.

While preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

What is claimed is:

1. A transfer case system comprising:
    a planetary gear set comprising a sun gear, a ring gear, at least one planetary gear intermeshed with the sun gear and ring gear, and a planetary carrier rotatably connected with the at least one planetary gear;
    a torque sink connected with the sun gear, the torque sink further comprising a pump having an outer rotor, an inner rotor, a fluid inlet line, a fluid outlet line, a fluid reservoir, and a fluid flow control device, wherein the sun gear is connected with a rotor of the pump; and,
    a torque input shaft operably connected with the planetary carrier, the torque input shaft also coupled with a primary drive train;
    wherein the torque sink applies a braking force to the rotation of the sun gear in response to instructions from a controller, causing the ring gear to output torque to a secondary drive train.

2. The transfer case system of claim 1 wherein the sun gear is connected with the outer rotor of the pump.

3. The transfer case system of claim 1 wherein the sun gear is connected with the inner rotor of the pump.

4. The transfer case system of claim 1 wherein the fluid flow control device operates between an open actuation state to allow substantially free flow of fluid within the pump and a closed actuation state that restricts fluid flow within the pump.

5. A vehicle control system for distributing torque to primary and secondary drive trains comprising:
    a planetary gear set comprising a sun gear, a ring gear, at least one planetary gear intermeshed with the sun gear and ring gear, and a planetary carrier rotatably connected with the at least one planetary gear;
    a torque sink connected with the sun gear, the torque sink further comprising a pump having an outer rotor, an inner rotor, a fluid inlet line, a fluid outlet line, a fluid reservoir, and a fluid flow control device, wherein the sun gear is connected with a rotor of the pump;
    a torque input shaft operably connected with the planetary carrier, the torque input shaft also coupled with a primary wheel drive shaft;
    a controller; and,
    sensors in communication with the controller wherein the sensors monitor vehicle conditions;
    wherein the torque sink, in response to instructions from the controller, applies a braking force to the rotation of the sun gear, causing the ring gear to output torque to a the secondary drive train.

6. The vehicle control system of claim 5 wherein the sun gear is connected with the outer rotor of the pump.

7. The vehicle control system of claim 5 wherein the sun gear is connected with the inner rotor of the pump.

8. The vehicle control system of claim 5 wherein the fluid flow control device operates between an open actuation state to allow substantially free flow of fluid within the pump and a closed actuation state that restricts fluid flow within the pump.

9. A method of distributing torque between a primary drive train and secondary drive train, the method comprising:

providing a transfer case system comprising a sun gear, a ring gear, at least one planetary gear intermeshed with the sun gear and ring gear, a planetary carrier rotatably connected with the at least one planetary gear, a torque sink connected with the sun gear, and an input shaft operably connected with the planetary carrier, the torque sink further comprising a pump having an outer rotor, an inner rotor, a fluid inlet line, a fluid outlet line, a fluid reservoir, and a fluid flow control device, wherein the sun pear is connected with a rotor of the pump;

monitoring vehicle conditions with sensors and a controller for predetermined vehicle conditions that require torque transfer from a primary drive train to the secondary drive train;

instructing the torque sink to apply a braking force to the rotation of the sun gear when the predetermined vehicle conditions are experienced;

outputting torque at the ring gear wherein the ring gear applies torque to a secondary drive train; and removing the braking force on the sun gear when the predetermined vehicle conditions are no longer experienced.

* * * * *

UNITED STATES PATENT AND TRADEMARK OFFICE
CERTIFICATE OF CORRECTION

PATENT NO. : 6,663,527 B2
DATED : December 16, 2003
INVENTOR(S) : Perry E. Phelan et al.

It is certified that error appears in the above-identified patent and that said Letters Patent is hereby corrected as shown below:

Title page,
Item [56], References Cited, U.S. PATENT DOCUMENTS, immediately after "Baxter" insert -- , Jr. --.

Column 6,
Line 63, before "the secondary" delete "a".

Column 8,
Line 2, delete "pear" and substitute -- gear -- in its place.

Signed and Sealed this

Twenty-seventh Day of April, 2004

JON W. DUDAS
*Acting Director of the United States Patent and Trademark Office*